(12) United States Patent
Wang et al.

(10) Patent No.: US 11,225,170 B2
(45) Date of Patent: Jan. 18, 2022

(54) BALANCING CELLS OF A TRACTION BATTERY USING STATISTICAL ANALYSIS

(71) Applicant: Ford Global Technologies, LLC, Dearborn, MI (US)

(72) Inventors: Rui Wang, Canton, MI (US); Xiao Guang Yang, Northville, MI (US); Yuan Zhang, Canton, MI (US); Xu Wang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 16/691,774

(22) Filed: Nov. 22, 2019

(65) Prior Publication Data

US 2021/0155116 A1 May 27, 2021

(51) Int. Cl.
*B60L 58/22* (2019.01)
*B60L 58/12* (2019.01)
*H02J 7/00* (2006.01)
*B60K 6/28* (2007.10)

(52) U.S. Cl.
CPC ............. *B60L 58/22* (2019.02); *B60L 58/12* (2019.02); *H02J 7/0016* (2013.01); *H02J 7/0048* (2020.01); *B60K 6/28* (2013.01); *B60L 2240/54* (2013.01); *B60Y 2200/91* (2013.01); *B60Y 2200/92* (2013.01)

(58) Field of Classification Search
CPC ...... B60L 58/22; B60L 58/12; B60L 2240/54; B60L 2260/44; B60L 58/14; B60L 58/15; H02J 7/0016; H02J 7/0048; B60Y 2200/92; B60Y 2200/91; B60K 6/28; Y02T 10/70; H01M 10/425; H01M 10/441; H01M 2010/4271; H01M 2220/20

See application file for complete search history.

(56) References Cited

U.S. PATENT DOCUMENTS

| 8,120,321 B2 | 2/2012 | Vezzini et al. | |
| 2010/0085009 A1* | 4/2010 | Kang | H02J 7/0016 320/118 |
| 2015/0046109 A1* | 2/2015 | Miwa | G01R 31/382 702/63 |

(Continued)

FOREIGN PATENT DOCUMENTS

FR 2952187 A1 5/2011

*Primary Examiner* — Nha T Nguyen
(74) *Attorney, Agent, or Firm* — David B Kelley; Brooks Kushman P.C.

(57) ABSTRACT

A vehicle includes a traction battery having a plurality of battery cells and a balance circuit configured to selectively discharge one or more of the battery cells. A controller is programmed to estimate charge capacities of the battery cells and determine a standard deviation of the estimated capacities. The controller is further programmed to determine a skewness of the estimated capacities. The controller is also programmed to, in response to the skewness exceeding a first threshold, command the balance circuit to discharge one or more of the battery cells when a state of charge (SOC) of the traction battery is less than a second threshold, and, in response to the skewness being less than the first threshold, command the balance circuit to discharge one or more of the battery cells when the SOC of the traction battery is greater than the second threshold.

20 Claims, 6 Drawing Sheets

(56) References Cited

U.S. PATENT DOCUMENTS

| | | | |
|---|---|---|---|
| 2016/0276847 A1* | 9/2016 | Kang | H01M 10/441 |
| 2018/0095137 A1* | 4/2018 | Yoshioka | G01R 19/16542 |
| 2018/0226808 A1* | 8/2018 | Kang | H02J 7/0021 |
| 2019/0165583 A1* | 5/2019 | Lee | H02J 7/0013 |
| 2021/0181256 A1* | 6/2021 | Kawamura | H01M 10/42 |

* cited by examiner

BALANCING CELLS OF A TRACTION BATTERY USING STATISTICAL ANALYSIS

TECHNICAL FIELD

This application relates to systems and methods for balancing cells of a traction battery.

BACKGROUND

Electrified vehicles include hybrid-electric and fully electric vehicles that are configured to provide propulsion with a powertrain having an electric motor. Electrified vehicles distribute energy to various components that are connected to a high-voltage electrical bus and a low-voltage electrical bus. Sources of energy include a traction battery that is connected to the high-voltage bus and an electric machine that is also connected to the high-voltage bus.

SUMMARY

According to one embodiment, a vehicle includes a traction battery having a plurality of battery cells and a balance circuit configured to selectively discharge one or more of the battery cells. A controller is programmed to estimate charge capacities of the battery cells and determine a standard deviation of the estimated capacities. The controller is further programmed to determine a skewness of the estimated capacities based on the standard deviation, the estimated capacities, and a mean of the estimated capacities. The controller is also programmed to, in response to the skewness exceeding a first threshold, command the balance circuit to discharge one or more of the battery cells when a state of charge (SOC) of the traction battery is less than a second threshold, and, in response to the skewness being less than the first threshold, command the balance circuit to discharge one or more of the battery cells when the SOC of the traction battery is greater than the second threshold.

According to another embodiment, a battery system includes a controller programmed to estimate individual cell capacities of a traction battery; in response to a standard deviation of the cell capacities being less than a first threshold, command balancing of the traction battery when a state of charge (SOC) of the traction battery exceeds a second threshold; and, in response to the standard deviation of the cell capacities exceeding the first threshold, command balancing of the traction battery based on a skewness of the cell capacities.

According to yet another embodiment, a method of balancing cells of a traction battery includes estimating capacities of the cells; calculating a standard deviation of the estimated capacities; and calculating a skewness of the estimate capacities based on the standard deviation, the estimated capacities, and a mean of the estimated capacities. The method further includes, in response to the skewness exceeding a first threshold and a state of charge (SOC) of the traction battery being less than a second threshold, balancing the traction battery such that the cells have a uniform SOC, and, in response to the skewness being less than the first threshold and the SOC of the traction battery exceeding the second threshold, balancing the traction battery such that the cells have a uniform SOC.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
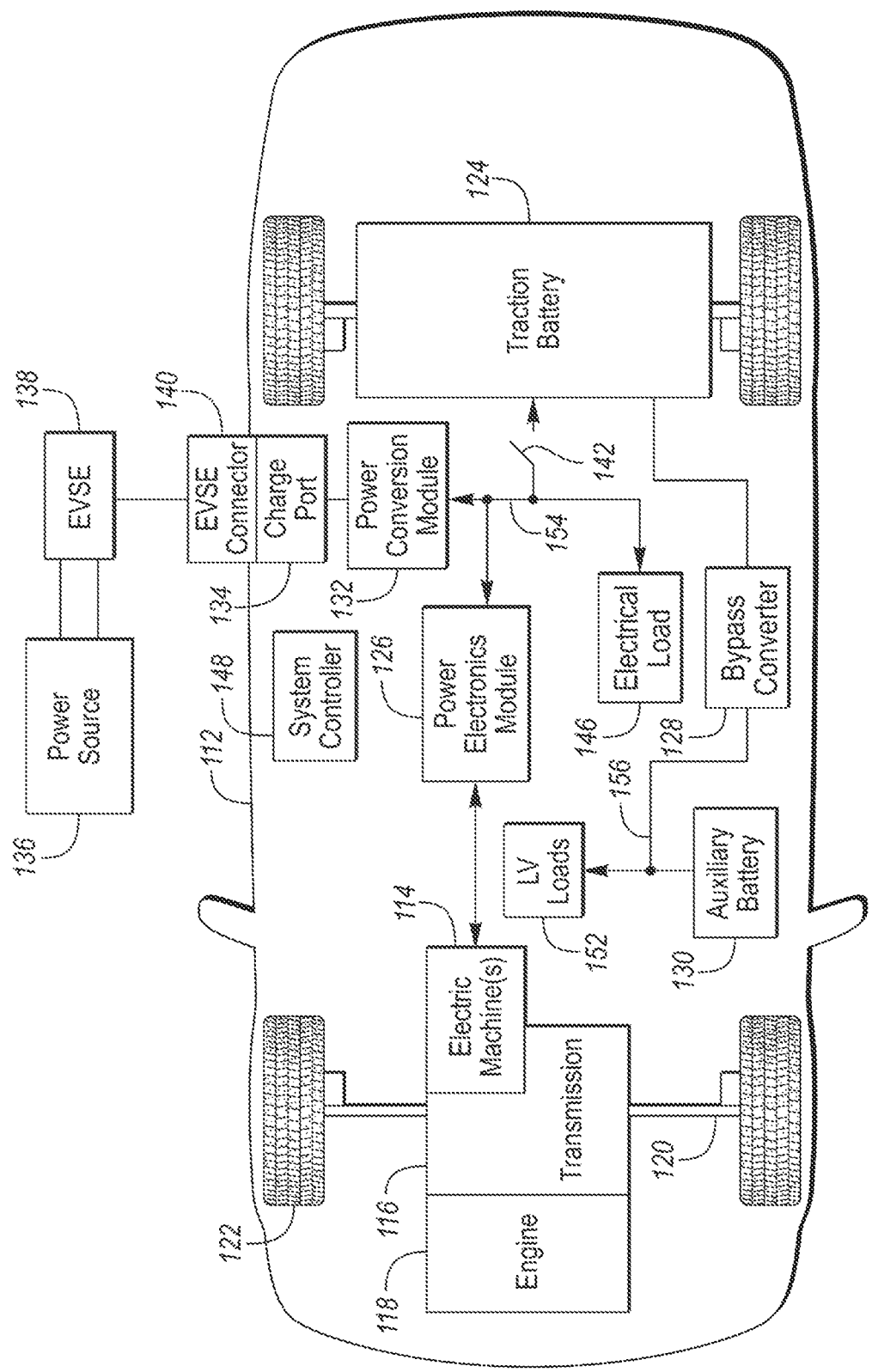
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may include one or more electric machines 114 mechanically coupled to a hybrid transmission 116. The electric machines 114 may be capable of operating as a motor or a generator and for simplicity may be referred to as a motor. The hybrid transmission 116 is also mechanically coupled to an engine 118. The hybrid transmission 116 is mechanically coupled to a drive shaft 120 powering the wheels 122. The electric machines 114 can provide propulsion and slowing capability when the engine 118 is turned ON or OFF. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 OFF under certain conditions. An electrified vehicle 112 may also be a battery electric vehicle (BEV). In a BEV configuration, the engine 118 may not be present.

A traction battery or battery pack 124 stores energy that can be used by the electric machines 114. The traction battery 124 may be electrically couplable to a high-voltage electrical bus 154. The high-voltage bus 154 may include power and return conductors. The vehicle battery pack 124 (also known as a traction battery) may provide a high-voltage direct current (DC) output. One or more contactors 142 may isolate the traction battery 124 from the high-voltage bus 154 when opened and connect the traction battery 124 to the high-voltage bus 154 when closed. The traction battery 124 may be electrically coupled to one or more power electronics modules 126 (sometimes called a traction inverter). The power electronics module 126 is electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC power to operate the electric machines 114. In a regenerative mode, the power electronics module 126 may convert the three-phase AC power from the electric machines 114 acting as generators to the DC power compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses. In addition to providing energy for propulsion, the traction battery 124 may provide energy for other vehicle electrical systems.

The vehicle 112 may include a bypass converter module 128 that converts the high voltage DC output of the traction battery 124 to a low voltage DC supply that is compatible with low-voltage vehicle loads 152. The bypass converter module 128 may be coupled between the high-voltage bus 154 and a low-voltage electrical bus 156. An output of the bypass converter module 128 may be electrically coupled to the low-voltage electrical bus 156 and to an auxiliary battery 130 (e.g., 12V battery) for charging the auxiliary battery 130. The low-voltage systems and loads 152 may be electrically coupled to the low-voltage electrical bus 156. The low-voltage bus 156 may include power and return conductors. One or more electrical loads 146 may be coupled to the high-voltage bus 154. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132.

The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic module that is present in the vehicle 112. A vehicle system controller (VSC) 148 may be present to coordinate the operation of the various components. Used herein, the term "controller" may refer to one or more controllers. One or more of the vehicle controllers may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Figure 2:
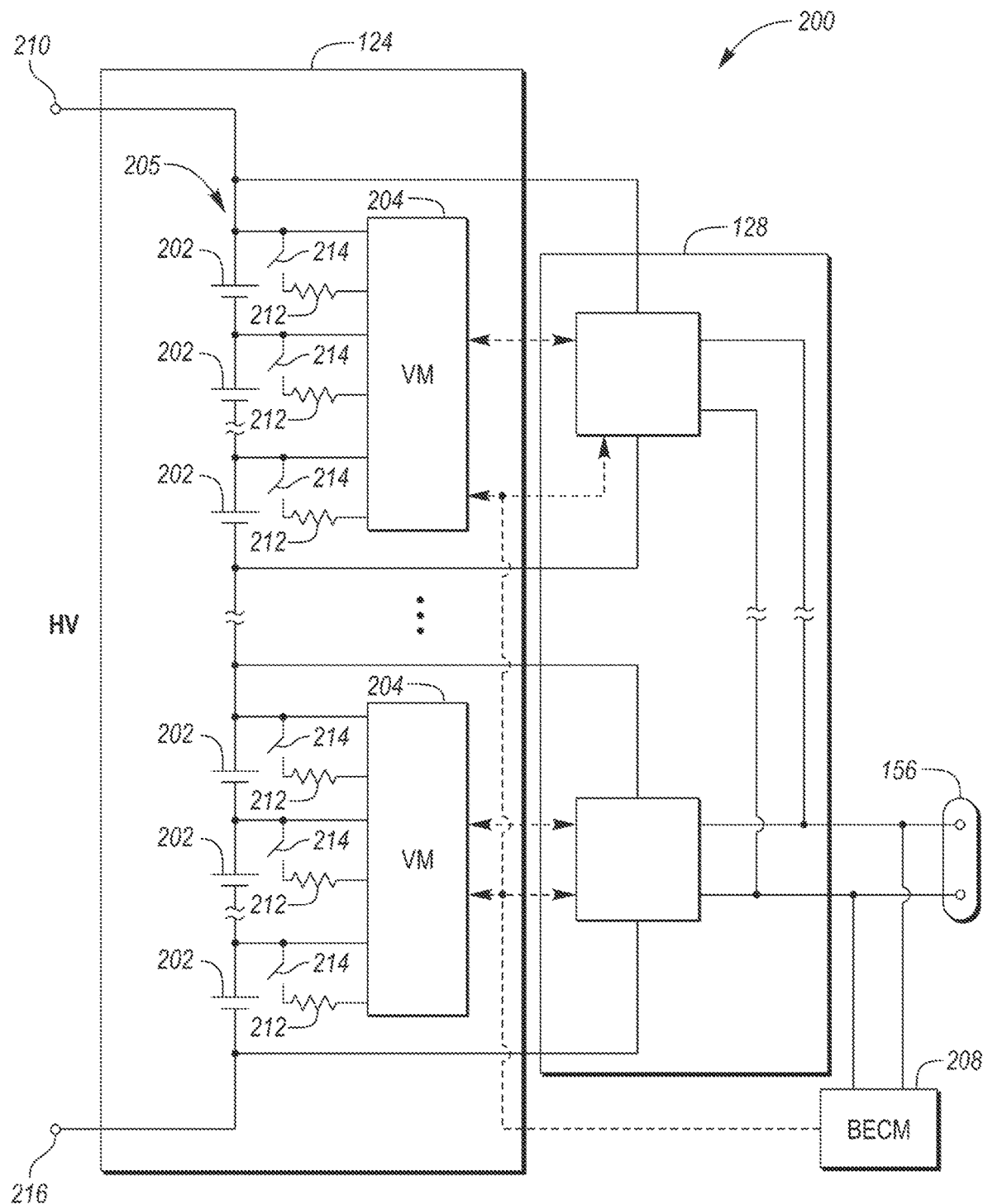
FIG. 2 is a diagram of a vehicle electrical system including balance circuits.

FIG. 2 depicts a possible configuration of a vehicle electrical system 200. The traction battery 124 may be coupled to the high-voltage electrical bus 156 through a positive terminal 210 and a negative or return terminal 216. The traction battery 124 may be comprised of a plurality of battery cells 202. The battery cells 202 may be constructed from a variety of chemical formulations. Typical battery pack chemistries may be lead acid, nickel-metal hydride (NIMH) or Lithium-Ion. The traction battery 124 may be comprised of a series configuration of n battery cells 202.

Other configurations are possible, however, and the traction battery 124 may be composed of any number of individual battery cells 202 connected in series or parallel or some combination thereof. The system may include one or more controllers, such as a Battery Energy Control Module (BECM) 208, that are configured to monitor and control the performance of the traction battery 124. The BECM 208 may monitor several traction battery characteristics such as pack current, pack voltage and pack temperature. The BECM 208 may include non-volatile memory such that data may be retained when the BECM 208 is in an OFF condition. Retained data may be available upon the next key cycle.

In addition to the pack level characteristics, there may be battery cell level characteristics that are measured and monitored. For example, the terminal voltage, current, and temperature of each of the battery cells 202 may be measured. The vehicle electrical system 200 may use one or more sensor modules 204 to measure the characteristics of the battery cells 202. The sensor modules 204 may include voltage sensors configured to measure the voltage across each of the battery cells 202. Depending on the capabilities, the sensor modules 204 may measure the characteristics of one and/or groups of the battery cells 202. The traction battery 124 may utilize multiple sensor modules 204 to measure the characteristics of all the battery cells 202. Each sensor module 204 may transfer the measurements to the BECM 208 for further processing and coordination. The sensor modules 204 may transfer signals in analog or digital form to the BECM 208. In some configurations, the sensor module 204 functionality may be incorporated internally to the BECM 208. That is, the sensor module 204 hardware may be integrated as part of the circuitry in the BECM 208 and the BECM 208 may handle the processing of raw signals.

The BECM 208 may be configured to compute various characteristics of the traction battery 124 and/or battery cells 202. Quantities such a battery power capability and battery state of charge (SOC) may be useful for controlling the operation of the traction battery 124 as well as any electrical loads 146 receiving power from the traction battery 124. Battery power capability is a measure of the maximum amount of power the traction battery 124 can provide or the maximum amount of power that the traction battery 124 can receive. Each of the battery cells 202 may be characterized by a battery power capability. Knowing the battery power capability allows electrical loads 146 to be managed such that the power requested is within limits that the traction battery 124 can handle.

Battery state of charge gives an indication of how much charge remains in the battery. The battery SOC may be output to inform the driver of how much charge remains in the traction battery 124, similar to a fuel gauge. The battery SOC may also be used to control the operation of an electrified vehicle. Calculation of battery cell SOC can be accomplished by a variety of methods. One possible method of calculating battery SOC is to perform an integration of the battery pack current over time. This is known in the art as ampere-hour integration. The SOC of each of the battery cells 202 may be computed in a similar manner.

Another feature of the traction battery 124 may be the ability to balance the battery cells 202. The traction battery 124 may include hardware and software features to perform balancing of the battery cells 202. Balancing the battery cells 202 may include charging or discharging individual battery cells 202 so that the states of charge or power capability of the battery cells 202 are equalized. This operation is useful to prevent overcharging and/or undercharging of individual battery cells. To facilitate cell balancing, the traction battery 124 and/or sensor modules 204 may include one or more balance circuits 205. Each cell may include a dedicated balance circuit 205. Each balance circuit 205 may include a switching element 214 and a resistor 212 coupled to an associated battery cell 202. The switching element 214 and the resistor 212 may be arranged so that the resistor 212 may be coupled in parallel with a battery cell 202 to cause current to flow from the battery cell 202 through the resistor 212. By activating the switching element 214, current may flow from the battery cell 202 through the resistor 212 to cause the cell SOC to decrease. The switching element 214 may be controllable by the sensor module 204 via a control signal. The switching element 214 may be in a normally open position. The switching element 214 may be a solid-state element (e.g., metal-oxide semiconductor field-effect transistor (MOSFET)). The cell balancing achieved by the resistor may be referred to as passive cell balancing as it only affects a discharge of the battery cells. Passive cell balancing may contribute to wasted energy since the energy is lost as heat in the resistor 212. The BECM 208 may be in communication with the sensor modules 204. For example, the BECM 208 and the sensor modules 204 may communicate via a CAN communication channel.

The individual capacities of the battery cells vary due to manufacturing imperfections and unequal degradation over time. (The capacities discussed herein are charge capacities, e.g., ampere hours (Ah), unless otherwise noted.) Cells with lower capacity charge to a higher SOC faster and discharge to a lower SOC faster than cells with a higher capacity. As discussed above, the traction battery 124 is balanced at various times so that all of the cells are at the same SOC to prevent overcharging and over depletion of the cells 202 having less capacity. The balancing circuits 205 functions by discharging higher SOC cells. This wastes energy. Optimizing the timing of when cell balancing occurs can reduce the amount of waste. Ideally, cell balancing will take place when the least amount of cells must be discharged. The following examples illustrate this point.

Figure 3A:
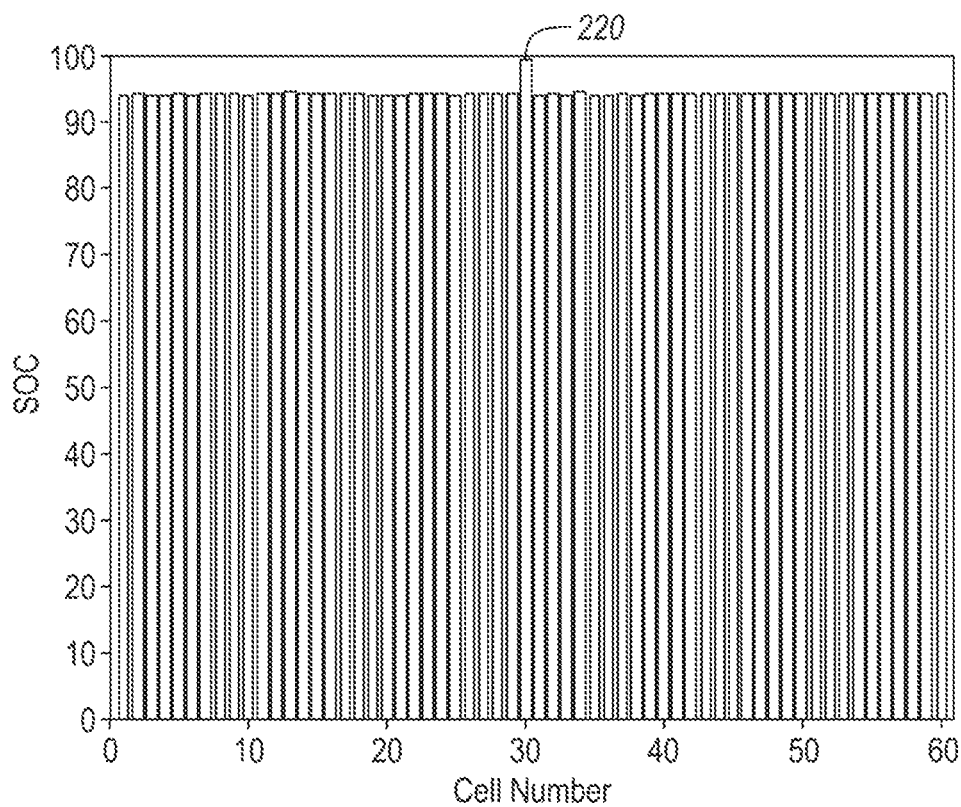
FIG. 3A is a bar graph showing cell states of charge of a battery after a charging event.
Figure 3B:
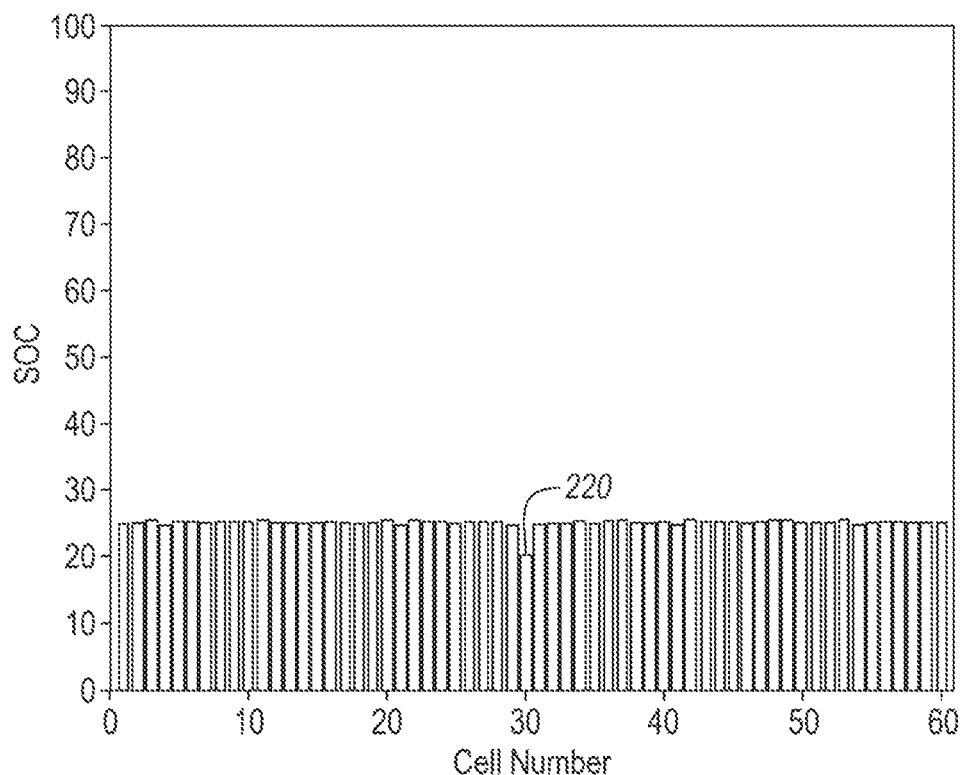
FIG. 3B is a bar graph showing the cell states of charge of the battery after a discharging event.

FIGS. 3A and 3B illustrate an example battery pack having one cell 220 with less capacity than the others. FIG. 3A shows the SOC of the cells after charging and FIG. 3B shows the SOC of the cells after discharging. The cell 220 has a higher SOC after charging and a lower SOC after discharging. The battery pack could be balanced at any time, however, the amount of wasted energy will vary greatly depending upon when the pack is balanced. If the battery pack is discharged after charging, only cell 220 is discharged. That is, only the energy stored in cell 220 is wasted. On the other hand, if the battery pack is balanced after discharge all of the cells except cell 220 will be discharge resulting in a much larger amount of wasted energy. The battery pack of FIGS. 3A and 3B could be optimized by balancing near the upper end of the SOC rather than near the lower end of SOC.

Figure 4A:
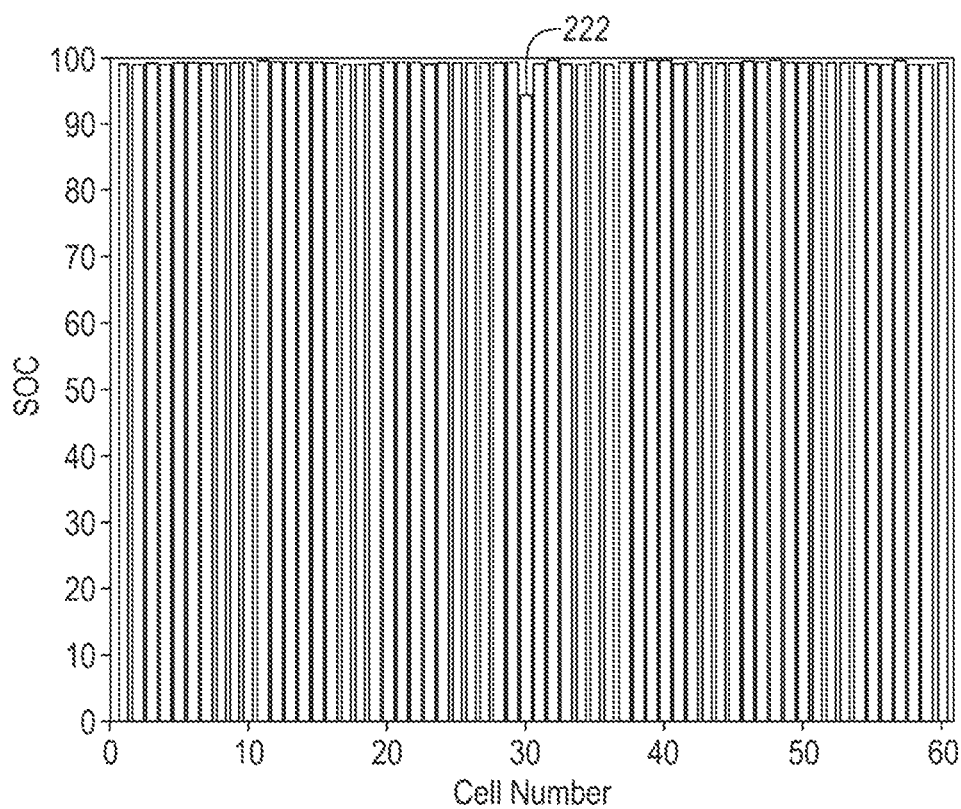
FIG. 4A is a bar graph showing cell states of charge of another battery after a charging event.
Figure 4B:
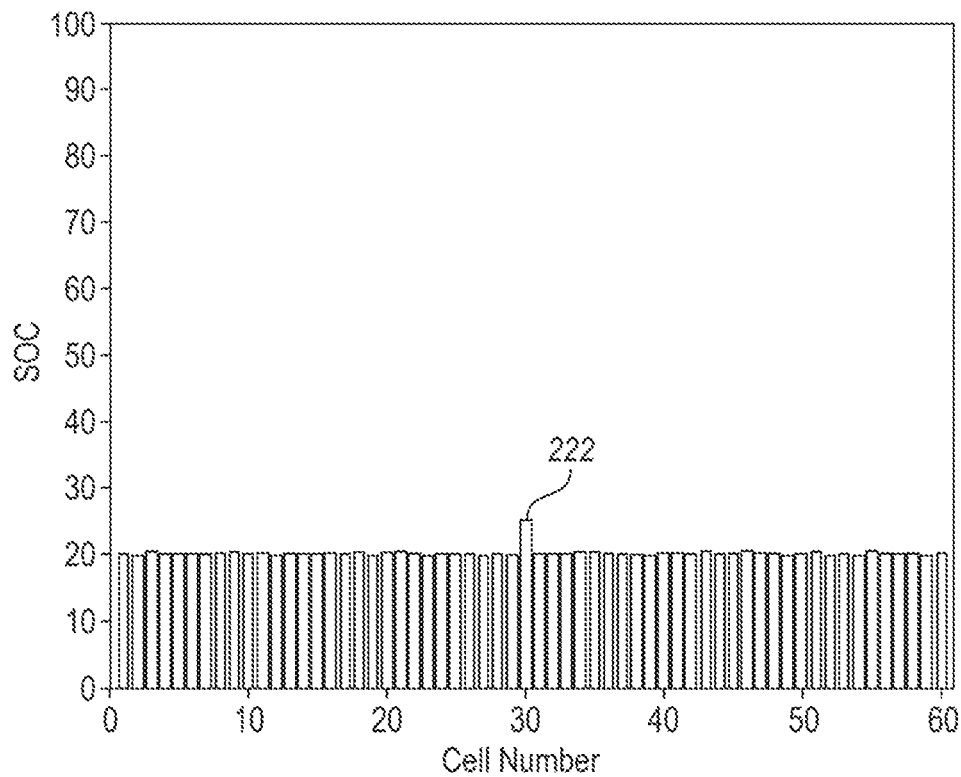
FIG. 4B is a bar graph showing the cell states of charge of the another battery after a discharging event.

FIGS. 4A and 4B illustrate another example battery pack having one cell 222 with more capacity than the others. FIG. 4A shows the SOC of the cells after charging and FIG. 4B shows the SOC of the cells after discharge. The cell 222 has a lower SOC after charging and a higher SOC after discharging. Again, the battery pack could be balanced at any time, however, the amount of wasted energy will vary greatly depending upon when the pack is balanced. If the battery pack is balanced after charging, all of the cells except cell 222 will discharged. On the other hand, if the battery pack is balanced after discharge only the cell 222 will be discharged. The battery pack of FIGS. 4A and 4B could be optimized by balancing near the lower end of the SOC rather than near the upper end of SOC.

As the above examples highlight, a considerable amount of energy can be saved by optimizing when cell balancing occurs. Statistical analysis of the capacities of the cells of the traction battery, particularly standard deviation and skewness, may be used to choose when to balance the traction battery 124. The following figures and related text describe example controls and methods for determining the timing of cell balancing based on statistical analysis.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 100. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
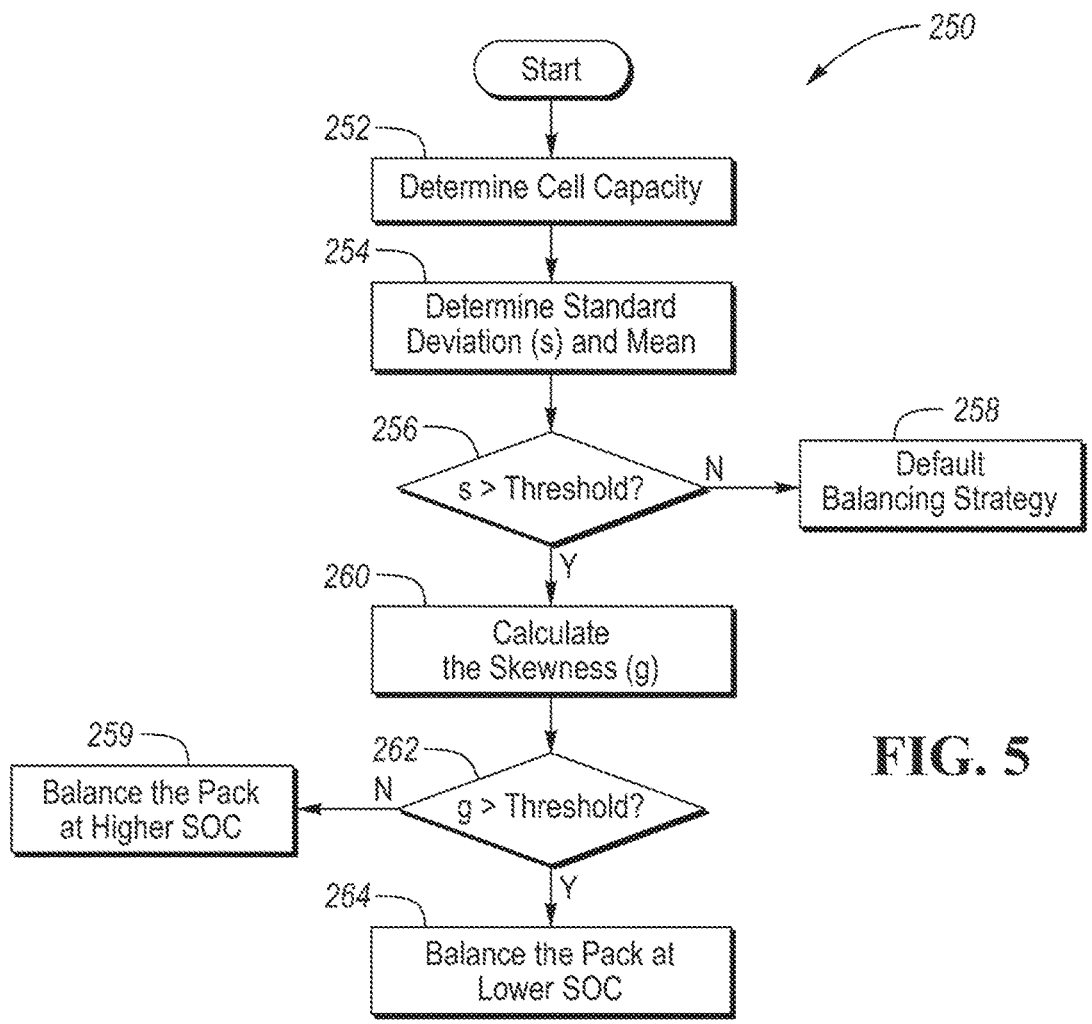
FIG. 5 is a flow chart of an algorithm for balancing cells of a traction battery.

FIG. 5 is a flow chart 250 of an algorithm for controlling the balance circuit(s) 205. At operation 252, the controller determines/estimates the charge capacities of each of the cells. The charge capacities may be in units of ampere hours (Ah). Once determined, the charge capacities are grouped in a dataset for statistical analysis.

At operation 254, the mean and the standard deviation of the capacities are calculated. The mean is calculated by summing the capacities of the cells and dividing by the number of cells. The standard deviation (S) may be calculated using equation 1, where $Y_i$ is the cell charge capacity, $\overline{Y}$ is the mean charge capacity of the traction battery, and N is the number of cells.

$$S = \sqrt{\frac{\sum_{i=1}^{N}(Y_i - \overline{Y})^2}{N-1}} \quad \text{(Eq. 1)}$$

At operation 256, the controller determines if the standard deviation is above a standard-deviation threshold (SD threshold). The threshold may be based on the total capacity of the traction battery. For example, the threshold may be between 1.0 to 2.5, and more particularly 2, for a traction battery rated at 18 Ah. Generally speaking, a traction battery with a lower standard deviation for cell capacity means the pack has a uniform distribution of cell capacity, and a traction battery with a higher standard deviation mean the cell capacity spreads over a wide range. If the pack has a large rated capacity (large battery pack), the standard deviation threshold can become relatively high. A normalized parameter can be applied to any size battery pack. Due to this, it is more efficient to discharge the battery at a higher SOC if the standard deviation is less than the SD threshold.

If no at operation 256, control passes to operation 258 and the traction battery is balanced according to a default balancing strategy. Since the standard deviation was low, i.e., below the threshold, the skewness was not considered. The default balancing strategy may be set to balance the cells at a lower SOC, a higher SOC, or may switch between the two. The controller may initiate cell balancing by commanding one or more of the switches 212 closed to activate the balance circuit(s) 205. Each of the switches remains closed until their associated cell discharges to a desired SOC, which may be the SOC of the lowest cell.

If the standard deviation is greater than the first threshold, skewness of the capacities is used to determine if the cells should be balanced at higher or lower SOC. The SOC of the traction battery is the average SOC of the cells. The higher SOC may be a first SOC threshold valve such as greater than or equal to 50 percent, and the lower SOC may be less than 50 percent.

The skewness value may be positive, negative, or zero. A symmetric distribution of cell capacity has a skew of zero. For a unimodal distribution, negative skew commonly indicates that the tail is on the left side (lower capacity) of the distribution, and positive skew indicates that the tail is on the right (higher capacity). But, in cases where one tail is long and skinny but the other tail is short and fat, skewness does not obey a simple rule. For the purposes of cell capacity distributions, however, a positive skew indicates a majority of the cells have a lower SOC and a negative skew indicates a majority of the cells have a higher SOC. As such, the controller may be programmed to balance the cells at a higher SOC when the skewness is less than a skewness threshold and programmed to balance the cells at a lower SOC when the skewness is greater than the skewness threshold. The skewness threshold may be between 0.2 and 0.8. For example, if the skewness value is greater than a skewness threshold of 0.5, the BECM may balance the pack at lower SOC. If the skewness value is less than the threshold, the BECM may balance the pack at higher SOC. The example threshold range is merely one example and may vary based on traction battery properties.

The skewness is calculated at operation 260 using equation 2, where g is skewness, s is standard deviation, $Y_i$ is the cell charge capacity, $\overline{Y}$ is the mean charge capacity of the traction battery, and N is the number of cells.

$$g = \frac{\sum_{i=1}^{N}(Y_i - \overline{Y})^3 \times \frac{1}{N}}{s^3} \quad \text{(Eq. 2)}$$

If skewness is less than the skewness threshold at operation 262, control passes to operation 259 and the cells are balanced at a higher SOC. That is, the controller waits to balance the cells until the SOC of the traction battery exceeds the threshold. The controller may be programmed to initiate cell balancing in response to the standard deviation exceeding than the SD threshold, the skewness being less than the threshold, and the SOC of the traction battery exceeding the SOC threshold.

If the skewness is greater than the skewness threshold at operation 262, control passes to operation 264. At operation 264, the traction battery is balanced at a lower SOC of the traction battery. The lower SOC may be a second SOC threshold valve such as less than 50 percent. In some embodiments, only one SOC threshold is used, i.e., the first and second SOC are the same. The controller waits to balance the cells until the SOC of the traction battery is below the second SOC threshold. That is, the controller may be programmed to initiate cell balancing in response to the standard deviation exceeding the SD threshold, the skewness exceeding the skewness threshold, and the SOC of the traction battery being less than the second SOC threshold. The controller may initiate cell balancing by commanding one or more of the switches 212 closed to activate the balance circuit(s) 205 as discussed above.

Figure 6:
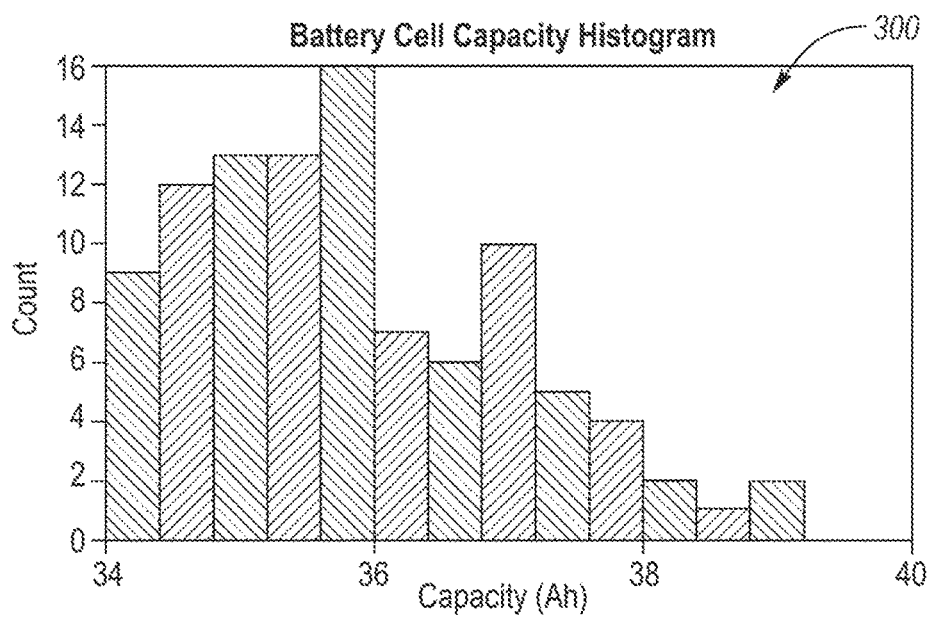
FIG. 6 is a battery cell capacity histogram of an example battery pack having 100 cells.

An example execution of the above method/controls 250 will now described in conjunction with the traction battery 300 shown in FIG. 6. (Note the calculations are based on the the x-axis in the plot ascending from lower capacity to higher capacity.) The traction battery 300 includes 100 cells having the charge capacity distribution shown in FIG. 6. In this example, the SD threshold is 1 and the skewness threshold is 0.5. The mean capacity is 35.65 Ah, the standard deviation is 1.1766, and the skewness is 0.624. Thus, the traction battery 300 is balanced at a lower SOC in this instance.

Figure 7:
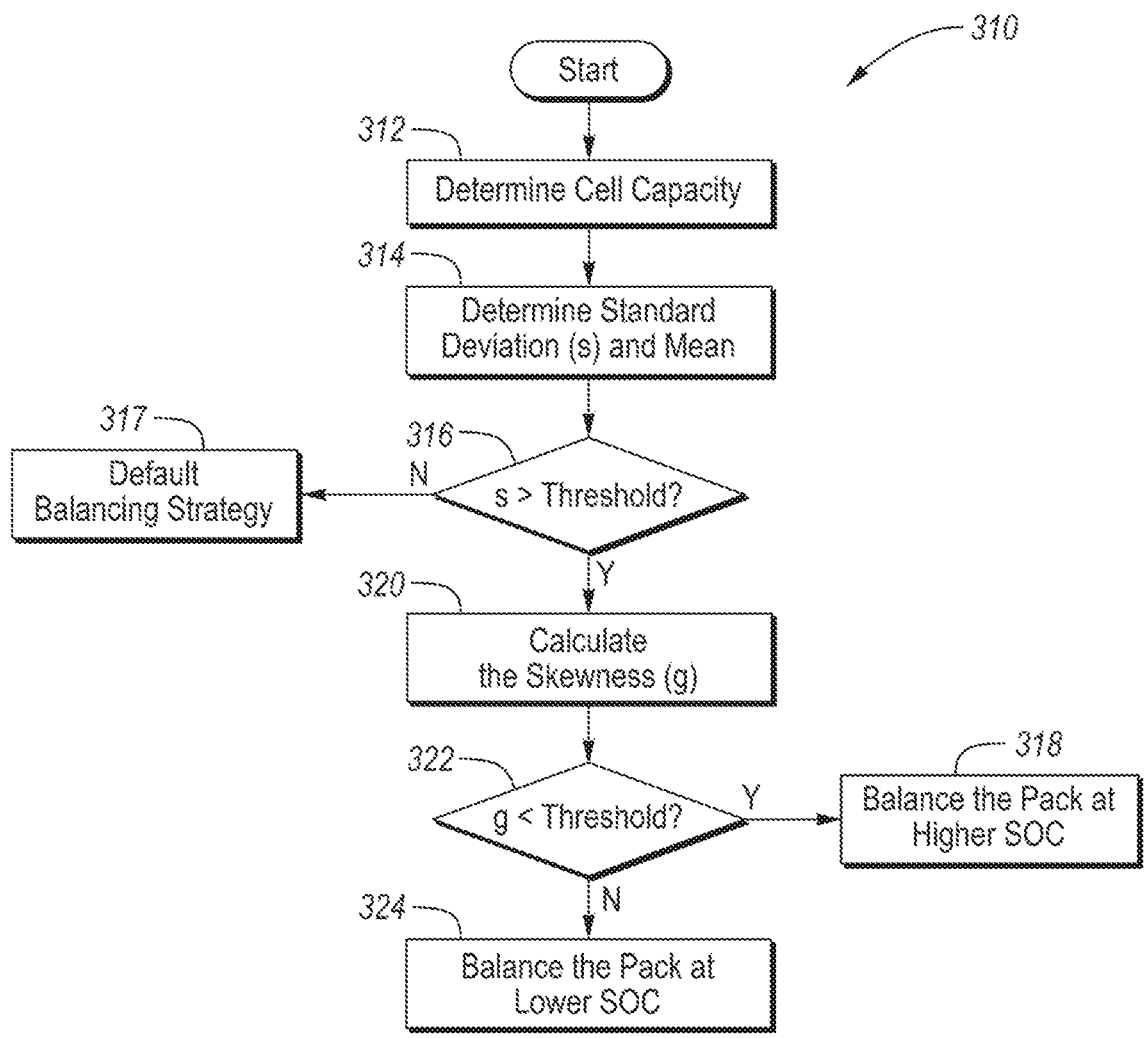
FIG. 7 is another flow chart of an algorithm for balancing cells of a traction battery.

FIG. 7 is another flow chart 310 of an algorithm for controlling the balance circuit(s) 205. The flow chart 310 is similar to flow chart 250 except that the controls favor cell balancing at lower SOC instead of higher SOC as described above. At operation 312, controller determines the charge capacities of each of the cells. At operation 314, the controller calculates the mean and the standard deviation of the capacities.

At operation 316, the controller determines if the standard deviation is above a standard-deviation threshold (SD threshold). If no at operation 316, control passes to operation 317 and the traction battery is balanced according to the default balancing strategy. If the standard deviation is greater than the first threshold, skewness of the capacities is used to determine when to balance the cells.

The skewness may be calculated at operation 320 using equation 2. At operation 322, the controller determines if the skewness is less than a threshold. The skewness threshold here may be negative, such as between −0.8 to −0.2. If the skewness is less than the threshold (more negative), control passes to operation 318 and the cells are balanced at a higher SOC of the traction battery, e.g., when the battery SOC is greater than 50 percent. If the skewness is greater than the threshold, control passes to operation 324 and the cells are balanced at a lower SOC of the traction battery, e.g., when the battery SOC is less than 50 percent.

The above described controls and methods balance the cells when statistical analysis indicates the least amount of energy is excepted to be discharged. This reduces wasted energy, which may increase electric range, reduce charging costs, and provide other benefits.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
 a traction battery including a plurality of battery cells;
 a balance circuit configured to selectively discharge one or more of the battery cells; and
 a controller programmed to
  estimate charge capacities of the battery cells,
  determine a standard deviation of the estimated capacities;
  determine a skewness of the estimated capacities based on the standard deviation, the estimated capacities, and a mean of the estimated capacities,
  in response to the skewness exceeding a first threshold, command the balance circuit to discharge one or more of the battery cells when a state of charge (SOC) of the traction battery is less than a second threshold, and
  in response to the skewness being less than the first threshold, command the balance circuit to discharge one or more of the battery cells when the SOC of the traction battery is greater than the second threshold.

2. The vehicle of claim 1, wherein the balance circuit includes resistors and switches.

3. The vehicle of claim 2, wherein the controller commands the balance circuit to discharge by commanding at least one of the switches to a closed position.

4. The vehicle of claim 1, wherein the second threshold is greater than or equal to 50 percent.

5. The vehicle of claim 1, wherein the first threshold is between 0.2 and 0.8, inclusive.

6. The vehicle of claim 5, wherein the skewness is further based on a summation of the capacities minus the mean capacity cubed, wherein the summation is divided by the number of battery cells and by the standard deviation cubed.

7. A battery system comprising:
 a controller programmed to
  estimate individual cell capacities of a traction battery,
  in response to a standard deviation of the cell capacities being less than a first threshold, command balancing of the traction battery when a state of charge (SOC) of the traction battery exceeds a second threshold, and
  in response to the standard deviation of the cell capacities exceeding the first threshold, command balancing of the traction battery based on a skewness of the cell capacities.

8. The battery system of claim 7, wherein the controller is further programmed to, in response to the standard deviation exceeding the first threshold and the skewness exceeding a third threshold, command balancing of the traction battery when the SOC is less than the second threshold.

9. The battery system of claim 8, wherein the controller is further programmed to, in response to the standard deviation exceeding the first threshold and the skewness being less than the third threshold, command balancing of the traction battery when the SOC is greater than the second threshold.

10. The battery system of claim 7, wherein second threshold is equal to or greater than 50 percent.

11. The battery system of claim 7, wherein the controller is further programmed to, in response to the standard deviation exceeding the first threshold and the skewness being less than a third threshold, command balancing of the traction battery when the SOC is higher than the second threshold.

12. The battery system of claim 11, wherein the controller is further programmed to, in response to the standard deviation exceeding the first threshold and the skewness exceeding the third threshold, command balancing of the traction battery when the SOC is lower than the second threshold.

13. The battery system of claim 7, wherein the skewness is calculated based on the cell capacities, the standard deviation, and a mean of the cell capacities.

14. The battery system of claim 7 further comprising a balance circuit configured to selectively discharge one or more cells of the traction battery.

15. The battery system of claim 14, wherein the balance circuit includes resistors and switches.

16. A method of balancing cells of a traction battery comprising:
    estimating capacities of the cells;
    calculating a standard deviation of the estimated capacities;
    calculating a skewness of the estimate capacities based on the standard deviation, the estimated capacities, and a mean of the estimated capacities;
    in response to the skewness exceeding a first threshold and a state of charge (SOC) of the traction battery being less than a second threshold, balancing the traction battery such that the cells have a uniform SOC; and
    in response to the skewness being less than the first threshold and the SOC of the traction battery exceeding the second threshold, balancing the traction battery such that the cells have a uniform SOC.

17. The method of claim 16, wherein the balancing includes closing one or more switches of a balancing circuit.

18. The method of claim 16, wherein the second threshold is greater than or equal to 50 percent.

19. The method of claim 16, wherein the first threshold is between 0.2 and 0.8, inclusive.

20. The method of claim 16 further comprising, in response to the standard deviation being less than a third threshold and the SOC of the traction battery pack exceeding the second threshold, balancing the traction battery such that the cells have a uniform SOC.

* * * * *